(12) United States Patent
Nakayama et al.

(10) Patent No.: US 8,800,269 B2
(45) Date of Patent: Aug. 12, 2014

(54) FUEL INJECTION SYSTEM OF AN INTERNAL COMBUSTION ENGINE

(75) Inventors: Yusuke Nakayama, Gotemba (JP); Toru Kidokoro, Hadano (JP); Hiroshi Sawada, Gotemba (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/140,293

(22) PCT Filed: Oct. 25, 2010

(86) PCT No.: PCT/JP2010/068862
§ 371 (c)(1),
(2), (4) Date: Jun. 16, 2011

(87) PCT Pub. No.: WO2012/056508
PCT Pub. Date: May 3, 2012

(65) Prior Publication Data
US 2013/0199163 A1 Aug. 8, 2013

(51) Int. Cl.
*F01N 3/00* (2006.01)
*F01N 9/00* (2006.01)
*F02D 19/08* (2006.01)
*F02D 19/06* (2006.01)

(52) U.S. Cl.
CPC .............. *F01N 9/00* (2013.01); *F02D 19/081* (2013.01); *F02D 19/0615* (2013.01); *F02D 19/0647* (2013.01)
USPC ................. 60/286; 60/299; 60/301; 123/304; 123/478; 123/431; 123/575

(58) Field of Classification Search
USPC ............ 60/284, 285; 123/1 A, 304, 431, 478, 123/491, 575; 701/104, 113
See application file for complete search history.

(56) References Cited

U.S. PATENT DOCUMENTS

| 5,566,653 A * | 10/1996 | Feuling ...................... 123/179.8 |
| 6,591,817 B2 * | 7/2003 | Deutsch ......................... 123/525 |
| 7,546,834 B1 * | 6/2009 | Ulrey et al. .................... 123/525 |
| 2010/0318277 A1 * | 12/2010 | Pursifull et al. .............. 701/103 |

FOREIGN PATENT DOCUMENTS

| JP | 2000-213394 A |   | 8/2000 |
| JP | 2001193511 A | * | 7/2001 |
| JP | 2002-038980 A |   | 2/2002 |
| JP | 2005-233135 A |   | 9/2005 |
| JP | 2008-169704 A |   | 7/2008 |

* cited by examiner

*Primary Examiner* — Thomas Denion
*Assistant Examiner* — Philip Eklem
(74) *Attorney, Agent, or Firm* — Sughrue Mion, PLLC

(57) ABSTRACT

In a fuel injection system of an internal combustion engine in which a first fuel, which has a property to inhibit the adsorption of exhaust gas components by an exhaust gas purification catalyst, and the second fuel, which has a property not to inhibit the adsorption of the exhaust gas components by the exhaust gas purification catalyst, are able to be selectively used, the present invention has a task to decrease an amount of consumption of the second fuel in a suitable manner. In order to solve this task, the fuel injection system of an internal combustion engine according the present invention is constructed such that the second fuel is first supplied to the internal combustion engine when the exhaust gas purification catalyst is in a cold state, and a change from the second fuel to the first fuel is then made before the exhaust gas purification catalyst subsequently rises in temperature to an activation temperature thereof.

7 Claims, 9 Drawing Sheets

1

FUEL INJECTION SYSTEM OF AN INTERNAL COMBUSTION ENGINE

CROSS REFERENCE TO RELATED APPLICATION

This application is a National Stage of International Application No. PCT/JP2010/068862, filed Oct. 25, 2010, the contents of which is incorporated herein by reference in its entirety.

TECHNICAL FIELD

The present invention relates to a control technique for an internal combustion engine which is able to use a plurality of kinds of fuels.

BACKGROUND ART

In recent years, there have been developed internal combustion engines which is able to operate by the use of a plurality of kinds of fuels. In such internal combustion engines, there has been proposed a technique in which a gas fuel (CNG) is used during a period of time from engine starting until a catalyst for exhaust gas purification becomes active, and a liquid fuel (gasoline) is used after the exhaust gas purification catalyst has become active (see, for example, Patent Document 1).

In addition, there has also been proposed a technique in which a gas fuel (CNG) is used during the time when an internal combustion engine is in a cold state, and a liquid fuel (gasoline) is used after the internal combustion engine has been warmed up (see, for example, a Patent Document 2).

PRIOR ART DOCUMENTS

Patent Documents

Patent Document 1: Japanese Patent Application Laid-Open No. 2002-038980
Patent Document 2: Japanese Patent Application Laid-Open No. 2000-213394

DISCLOSURE OF THE INVENTION

Problem to be Solved by the Invention

Incidentally, as an exhaust gas purification catalyst arranged on an exhaust passage of an internal combustion engine, there may be used a catalyst which adsorbs specific exhaust gas components (e.g., nitrogen oxides ($NO_x$), etc.) may be used during the time when the exhaust gas purification catalyst is in a cold state. A maximum value of an amount of exhaust gas components (hereinafter referred to as "a maximum amount of adsorption") which can be adsorbed by such an exhaust gas purification catalyst has a tendency to become smaller when the temperature of the exhaust gas purification catalyst is high than when it is low. Therefore, when a change from a gas fuel to a liquid fuel is carried out by using as a parameter(s) an activity state of the exhaust gas purification catalyst and/or a warming-up state of the internal combustion engine, there is a possibility that the above-mentioned maximum amount of adsorption may become too small before the change of fuel is carried out. In that case, the gas fuel will be consumed in a state in which the effect of reducing exhaust emissions by use of the gas fuel can not be obtained to a sufficient extent.

The present invention has been made in view of the circumstances as referred to above, and the object of the invention is to decrease a consumption of a second fuel in an effective manner, in a fuel injection system of an internal combustion engine in which a first fuel, which has a property to inhibit the adsorption of exhaust gas components by an exhaust gas purification catalyst, and the second fuel, which has a property not to inhibit the adsorption of the exhaust gas components by the exhaust gas purification catalyst, are able to be selectively used.

Means for Solving the Problem

In order to solve the above-mentioned problem, the present invention carries out a change between fuels by focusing attention on a maximum amount of adsorption in the form of a maximum value of an amount of nitrogen oxides which can be adsorbed by an exhaust gas purification catalyst in a fuel injection system of an internal combustion engine in which a first fuel, which inhibits the adsorption of nitrogen oxides by the exhaust gas purification catalyst, and a second fuel, which does not inhibit the adsorption of the nitrogen oxides by the exhaust gas purification catalyst, are able to be used.

As a result of keen and earnest experiments and verification carried out by the inventor of the present application, it has been found that a maximum amount of adsorption of the exhaust gas purification catalyst becomes relatively small before the exhaust gas purification catalyst becomes active. For that reason, if the second fuel continues to be used until the exhaust gas purification catalyst becomes active, there will be a possibility that the second fuel may be consumed under a condition in which an exhaust emission decreasing effect due to the use of the second fuel is not obtained to a sufficient extent.

Accordingly, the present invention resides in a fuel injection system of an internal combustion engine in which an exhaust gas purification catalyst, which adsorbs nitrogen oxides in an exhaust gas when it is in a cold state lower in temperature than an activation temperature thereof, is arranged on an exhaust system, wherein the fuel injection system comprises:

a supply device that supplies to said internal combustion engine either a first fuel which inhibits a phenomenon in which nitrogen oxides are adsorbed to said exhaust gas purification catalyst or a second fuel which does not inhibit the phenomenon in which nitrogen oxides are adsorbed to said exhaust gas purification catalyst; and a control unit that controls said supply device in such a manner that said second fuel is first supplied to said internal combustion engine when said exhaust gas purification catalyst is in a cold state, and a change from said second fuel to said first fuel is then made before said exhaust gas purification catalyst subsequently rises in temperature to said activation temperature.

According to such an invention, a change from the second fuel to the first fuel is carried out before the exhaust gas purification catalyst becomes active. For that reason, the second fuel is prevented from being consumed even after the maximum amount of adsorption of the exhaust gas purification catalyst has become small. As a result, the consumption of the second fuel can be suppressed to be small, while obtaining the effect of decreasing the exhaust emission by the use of the second fuel.

The control unit according to the present invention may control said supply device in such a manner that a change from said second fuel to said first fuel is made when the maximum amount of adsorption which is a maximum value of an amount of nitrogen oxides which can be adsorbed to the exhaust gas purification catalyst decreases to less than a lower limit value thereof. The "lower limit value" referred to herein corresponds to a maximum amount of adsorption at the time when an amount of nitrogen oxides, which flows out of the exhaust gas purification catalyst without being adsorbed to the exhaust gas purification catalyst, becomes equal to an upper limit value of an allowable range thereof. In cases where the change from the second fuel to the first fuel is carried out according to such a method, the second fuel is no longer used at the time when the maximum amount of adsorption of the exhaust gas purification catalyst becomes less than the lower limit value.

The control unit according to the present invention may make a determination that the maximum amount of adsorption of the exhaust gas purification catalyst has become less than the lower limit value, at the time when the temperature of the exhaust gas purification catalyst has reached an adsorption limit temperature which is lower than the activation temperature. That is, when the temperature of the exhaust gas purification catalyst exceeds the adsorption limit temperature which is lower than the activation temperature thereof, the control unit may control said supply device in such a manner that the change from the second fuel to the first fuel is carried out.

The maximum amount of adsorption of the exhaust gas purification catalyst correlates with the temperature of the exhaust gas purification catalyst. That is, the maximum amount of adsorption of the exhaust gas purification catalyst is smaller when the temperature of the exhaust gas purification catalyst is high than when it is low. Therefore, by setting, as the "adsorption limit temperature", the temperature of the exhaust gas purification catalyst at the time when the maximum amount of adsorption of the exhaust gas purification catalyst becomes equal to said lower limit value, it becomes possible to make the change from the second fuel to the first fuel at the time when the maximum amount of adsorption of the exhaust gas purification catalyst becomes less than the lower limit value.

Here, note that in cases where a $NO_X$ sensor is arranged on an exhaust passage downstream of the exhaust gas purification catalyst, when a measured value of the $NO_X$ sensor exceeds an allowable limit value, a determination can also be made that the maximum amount of adsorption of the exhaust gas purification catalyst has dropped to less than the lower limit value thereof.

Here, in cases where the first fuel is a liquid fuel containing alcohol, said lower limit value may be set to a value which is smaller when an alcohol concentration of the first fuel is high than when it is low. That is, in cases where the first fuel is a liquid fuel containing alcohol, said adsorption limit temperature may be set to a value which is higher when the alcohol concentration of the first fuel is high than when it is low.

When the alcohol concentration of the first fuel is high, substances (e.g., non-methane hydrocarbons, etc.) which are adsorbed to the exhaust gas purification catalyst in preference to nitrogen oxides become more as compared with the case where it is low. For that reason, if the lower limit value is set to a large value (the adsorption limit temperature is set to a low temperature) when the alcohol concentration of the first fuel is high, the amount of nitrogen oxides, which are adsorbed to the exhaust gas purification catalyst after a change has been made from the second fuel to the first fuel, may become excessively small. In contrast to this, if the lower limit value is set to a small value (the adsorption limit temperature is set to a high value) when the alcohol concentration of the first fuel is high, the amount of nitrogen oxides, which flow out of the exhaust gas purification catalyst without being adsorbed to the exhaust gas purification catalyst, can be suppressed to be small.

The control unit according to the present invention may control in such a manner that a change from the first fuel to the second fuel is not made when the maximum amount of adsorption of the exhaust gas purification catalyst increases equal to or more than the lower limit value thereof after a change from the second fuel to the first fuel has been made. According to such a method, it is possible to suppress hunting in which a change from the second fuel to the first fuel and a change from the first fuel to the second fuel are repeated in an alternate manner. As a result, it is possible to avoid in a more reliable manner a situation in which the consumption of the second fuel increases or the exhaust emission increases.

In the present invention, a non-methane based hydrocarbon fuel can be used as the first fuel, and at the same time, compressed natural gas (CNG) can be used as the second fuel. A lot of non-methane hydrocarbons are contained in a burned gas of the non-methane based hydrocarbon fuel. Non-methane hydrocarbons tend to be adsorbed more easily by the exhaust gas purification catalyst, as compared with nitrogen oxides. For that reason, in cases where a non-methane based hydrocarbon fuel is used, the amount of nitrogen oxides which are adsorbed to the exhaust gas purification catalyst becomes small. In other words, the amount of the nitrogen oxides which are actually adsorbed to the exhaust gas purification catalyst may not reach the maximum amount of adsorption thereof. On the other hand, in the burned gas of compressed natural gas (CNG), non-methane hydrocarbons are not substantially contained. For that reason, in cases where natural gas is used, the amount of nitrogen oxides which are adsorbed to the exhaust gas purification catalyst becomes more, compared with the case where a non-methane based hydrocarbon fuel is used.

Therefore, when a non-methane based hydrocarbon fuel is used as the first fuel in the present invention and compressed natural gas (CNG) is used as the second fuel, the consumption of the compressed natural gas (CNG) can be suppressed to be small, while suppressing an increase in the amount of emission of nitrogen oxides.

Here, note that in the present invention, when there is a large remaining amount of the second fuel and the operating state of the internal combustion engine is in a light load operating state (e.g., an idle operation state), the control unit may control the supply device in such a manner that the use of the second fuel is also continued even after the maximum amount of adsorption of the exhaust gas purification catalyst becomes less than the lower limit value, or after the temperature of the exhaust gas purification catalyst exceeds the adsorption limit temperature. When the internal combustion engine is in a light load operating state (in particular when it is in an idle operation state), the fuel consumption is small. Therefore, even if the use of a small amount of the second fuel is continued during the time when there is a large remaining amount of the second fuel, it is possible to avoid a situation where a travel range by the second fuel is shortened to a substantial extent. In addition, as a method of stopping the operation of the internal combustion engine, a method of turning off an ignition switch when the internal combustion engine is in an idle operation state is common. For that reason, if the second fuel is used when the internal combustion engine is in an idle operation state, it is possible to make the non-methane hydrocarbons, which have been adsorbed to the exhaust gas purification catalyst at the time of the shutdown of the internal combustion engine, as small as possible. As a result, the amount of nitrogen oxides which can be adsorbed to the exhaust gas purification catalyst at the time of next engine starting can be increased.

Effects of the Invention

According to the present invention, in a fuel injection system of an internal combustion engine in which a first fuel, which has a property to inhibit the adsorption of exhaust gas components by an exhaust gas purification catalyst, and a second fuel, which has a property not to inhibit the adsorption of the exhaust gas components by the exhaust gas purification catalyst, are able to be selectively used, it is possible to decrease a consumption of the second fuel in a suitable manner.

THE BEST MODE FOR CARRYING OUT THE INVENTION

Hereinafter, specific embodiments of the present invention will be described based on the attached drawings. However, the dimensions, materials, shapes, relative arrangements and so on of component parts described in the embodiments are not intended to limit the technical scope of the present invention to these alone in particular as long as there are no specific statements.

First Embodiment

Figure 1:
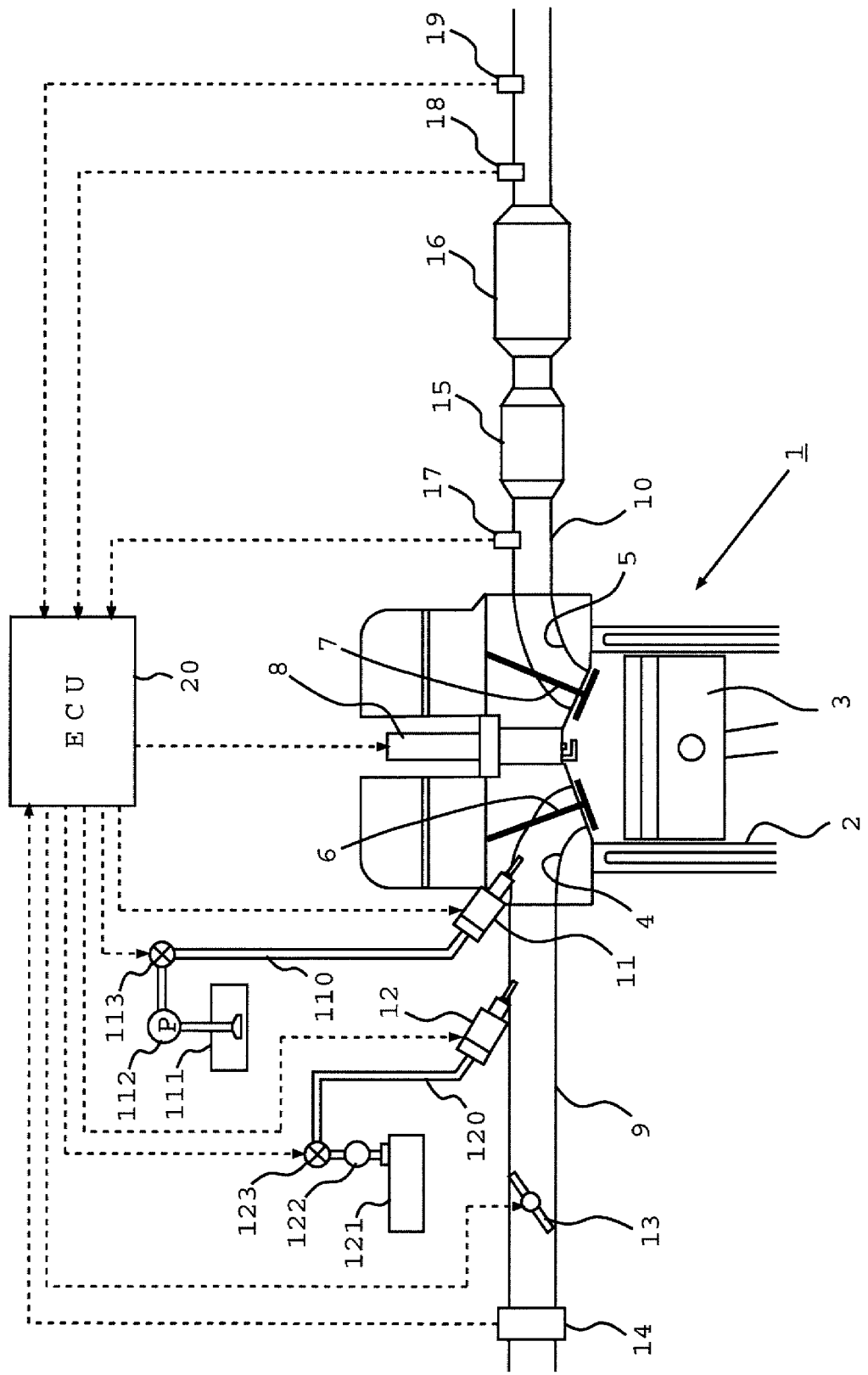
FIG. 1 is a view showing the schematic construction of an internal combustion engine to which the present invention is applied, in a first embodiment.

First, reference will be made to a first embodiment of the present invention based on FIGS. 1 through 4. FIG. 1 is a view showing the schematic construction of an internal combustion engine to which the present invention is applied.

The internal combustion engine 1 shown in FIG. 1 is a spark ignition type internal combustion engine which is able to use two kinds of fuels, a liquid fuel and a gas fuel. As the liquid fuel referred to herein, there can be used a petroleum based liquid fuel such as gasoline, etc., or a non-methane hydrocarbon fuel such as a mixed liquid fuel in which ethanol, methanol, or the like is mixed into a petroleum based liquid fuel. In addition, as the gas fuel, there can be used compressed natural gas (CNG). Here, note that the internal combustion engine 1 is not limited to an internal combustion engine of spark ignition type, but may be an internal combustion engine of compression ignition type.

A piston 3 is fitted in a cylinder 2 of the internal combustion engine 1 for sliding movement relative thereto. The piston 3 is connected with an engine output shaft (crankshaft) through an unillustrated connecting rod. The internal combustion engine 1 is provided with an intake port 4 for introducing fresh air (air) into the cylinder 2, and an exhaust port 5 for discharging burned gas from the interior of the cylinder 2. The internal combustion engine 1 is also provided with an intake valve 6 for opening and closing an opening end of the intake port 4, and an exhaust valve 7 for opening and closing an opening end of the exhaust port 5. The intake valve 6 and the exhaust valve 7 are driven to open and close by means of an unillustrated intake camshaft and an unillustrated exhaust camshaft, respectively. In addition, the internal combustion engine 1 is further provided with an ignition plug 8 for generating a spark as fire in the cylinder 2.

An intake passage 9 is connected to the above-mentioned intake port 4. The intake passage 9 is a passage for guiding the fresh air (air) taken in from atmospheric air to the intake port 4. On the other hand, an exhaust passage 10 is connected to the above-mentioned exhaust port 5. The exhaust passage 10 is a passage for discharging the burned gas (exhaust gas) which flows out of the exhaust port 5 into atmospheric air, after causing it to pass through exhaust gas purification devices 15, 16 to be described later, etc.

Here, a supply device for supplying the liquid fuel and the gas fuel to the internal combustion engine in a selective manner is arranged in the internal combustion engine 1. The supply device is provided with a first fuel injection valve 11, a first fuel passage 110, a first fuel tank 111, a fuel pump 112, a first cutoff valve 113, a second fuel injection valve 12, a second fuel passage 120, a second fuel tank 121, and a regulator 122. Here, note that the first fuel injection valve 11 and the second fuel injection valve 12 should be arranged for each cylinder, respectively.

The first fuel injection valve 11 is mounted on the internal combustion engine 1 at a location in the vicinity of the intake port 4, and serves to inject the liquid fuel into the intake port 4. The first fuel injection valve 11 is in fluid communication or connection with the first fuel tank 111 through the first fuel passage 110. Between the ends of the first fuel passage 110, there are arranged the fuel pump 112 and the first cutoff valve 113. The fuel pump 112 serves to supply the liquid fuel stored in the first fuel tank 111 to the first fuel injection valve 11. The first cutoff valve 113 is a device which serves to switch over between the cutoff (blocking) and communication of the first fuel passage 110.

The second fuel injection valve 12 is mounted on the above-mentioned intake passage 9 at a location in the vicinity of the above-mentioned intake port 4, and serves to inject the gas fuel into the intake passage 9. The second fuel injection valve 12 is in fluid communication or connection with the second fuel tank (CNG bomb) 121 through the second fuel passage 120. Between the ends of the second fuel passage 120, there are arranged the regulator 122 and a second cutoff valve 123. The regulator 122 is a device which serves to reduce the pressure of compressed natural gas (CNG) to a predetermined pressure. The second cutoff valve 123 is a device which serves to switch over between the cutoff (blocking) and communication of the second fuel passage 120.

Then, a throttle valve 13 is arranged on the intake passage 9 at a location upstream of the above-mentioned second fuel injection valve 12. The throttle valve 13 is a device which controls an amount of intake air to be introduced into the cylinder 2 by changing the passage cross sectional area of the intake passage 9. An air flow meter 14 is mounted on the intake passage 9 at a location upstream of the throttle valve 13. The air flow meter 14 is a sensor that outputs an electrical signal which is correlated with an amount of air (mass) flowing in the intake passage 9.

In addition, the first exhaust gas purification device 15 is arranged on the above-mentioned exhaust passage 10. The first exhaust gas purification device 15 includes a three-way catalyst which serves to adsorb the nitrogen oxides ($NO_X$) in the exhaust gas when it is in a cold state. The first exhaust gas purification device 15 corresponds to an exhaust gas purification catalyst according to the present invention.

The second exhaust gas purification device 16 is arranged on the exhaust passage 10 at a location downstream of the above-mentioned first exhaust gas purification device 15. The second exhaust gas purification device 16 includes a catalyst which serves to adsorb the nitrogen oxides ($NO_X$) in the exhaust gas, similar to the first exhaust gas purification device 15.

An air fuel ratio sensor 17 is arranged on the exhaust passage 10 at a location upstream of the above-mentioned first exhaust gas purification device 15. The air fuel ratio sensor 17 is a sensor that outputs an electrical signal which is correlated with an air fuel ratio of the exhaust gas flowing through the exhaust passage 10. An $O_2$ sensor 18 and an exhaust gas temperature sensor 19 are arranged on the exhaust passage 10 at locations downstream of the second exhaust gas purification device 16. The $O_2$ sensor 18 is a sensor that outputs an electrical signal which is correlated with a concentration of oxygen contained in the exhaust gas. The exhaust gas temperature sensor 19 is a sensor that outputs an electrical signal which is correlated with a temperature of the exhaust gas.

An electronic control unit (ECU) 20 is provided in combination with the internal combustion engine 1 as constructed in this manner. The ECU 20 is constructed such that it is electrically connected to the above-mentioned various kinds of sensors such as the air flow meter 14, the air fuel ratio sensor 17, the $O_2$ sensor 18, the exhaust gas temperature sensor 19, etc., so that the output signals of the various kinds of sensors can be inputted to the ECU. The ECU 20 is also constructed such that it is electrically connected to the above-mentioned various kinds of devices such as the ignition plug 8, the first fuel injection valve 11, the second fuel injection valve 12, the throttle valve 13, the fuel pump 112, the first cutoff valve 113, the second cutoff valve 123, etc., so that it can control the various kinds of devices in accordance with the output signals of the above-mentioned various kinds of sensors.

For example, the ECU 20 carries out fuel change control in which the gas fuel is first supplied to the internal combustion engine 1 at the time when the internal combustion engine 1 is started in the cold state thereof, and then a change from the gas fuel to the liquid fuel is made at the time when a prescribed condition is satisfied. In the following, reference will be made to how to carry out the fuel change control in this embodiment.

The three-way catalyst included in the first exhaust gas purification device 15 adsorbs the $NO_X$ in the exhaust gas when it is in a cold state lower than an activation temperature thereof. For that reason, even in cases where the first exhaust gas purification device 15 is in an unactivated state, as in the case where the internal combustion engine 1 is started in the cold state, it is possible to suppress the amount of $NO_X$ discharged into atmospheric air to a small value if the $NO_X$ in the exhaust gas is adsorbed by the first exhaust gas purification device 15.

However, in cases where non-methane hydrocarbons are contained in the exhaust gas, the non-methane hydrocarbons are adsorbed to the first exhaust gas purification device 15 in preference to $NO_X$. For that reason, when the amount of the non-methane hydrocarbons contained in the exhaust gas increases during the time the first exhaust gas purification device 15 is in a cold state, the amount of $NO_X$ adsorbed to the first exhaust gas purification device 15 decreases, and the amount of $NO_X$ discharged into atmospheric air increases.

Here, the burned gas of the liquid fuel (non-methane hydrocarbon fuel) contains a large amount of non-methane hydrocarbons as compared with the burned gas of the gas fuel (compressed natural gas (CNG)). Therefore, when the liquid fuel is used at the time of cold start of the internal combustion engine 1, the amount of $NO_X$ adsorbed to the first exhaust gas purification device 15 decreases, so there is a possibility that the amount of $NO_X$ discharged into atmospheric air may become more than a regulated amount thereof. In contrast to this, when the gas fuel is used at the time of cold start of the internal combustion engine 1, the amount of $NO_X$ adsorbed to the first exhaust gas purification device 15 can be increased, so that it is possible to suppress the amount of $NO_X$ discharged into atmospheric air to less than the regulated amount.

Figure 2:
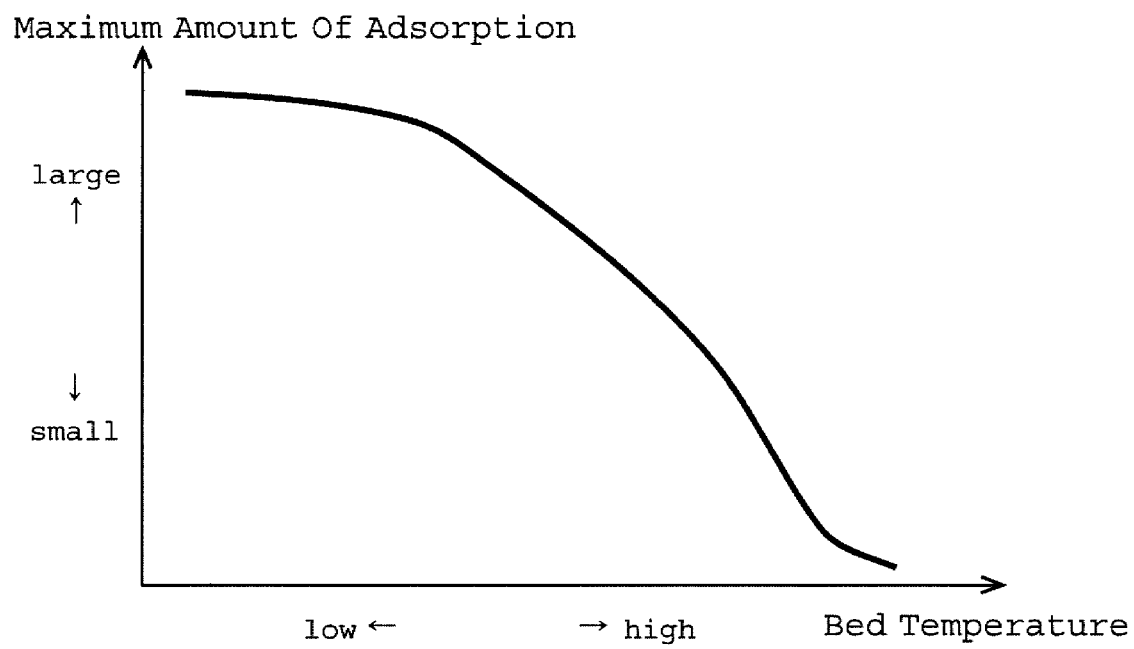
FIG. 2 is a view showing the relation between a bed temperature and a maximum amount of adsorption of a first exhaust gas purification device.

Incidentally, a maximum value of the amount of $NO_X$ (a maximum amount of adsorption) which can be adsorbed by the first exhaust gas purification device 15 tends to be smaller when the temperature (bed temperature) of the first exhaust gas purification device 15 is higher as compared with when it is low, as shown in FIG. 2. For that reason, if the gas fuel continues to be used until the temperature of the first exhaust gas purification device 15 becomes high, the consumption of the gas fuel will increase in a state where an exhaust emission decreasing effect due to the use of the gas fuel is not obtained to a sufficient extent. In addition, because the gas fuel is lower in energy density than the liquid fuel, a travel range in the case of using the gas fuel tends to be shorter than that in the case of using the liquid fuel. Therefore, if the consumption of the gas fuel increases unnecessarily, there will occur a situation where the gas fuel can not be used at the time of cold start of the internal combustion engine 1, or a situation where it becomes necessary to replenish the gas fuel (supply or fill the fuel) in a frequent manner.

Accordingly, in the fuel injection system of the internal combustion engine which uses the gas fuel at the time of cold start of the internal combustion engine 1, the fuel change control in this embodiment is carried out in such a manner that the change from the gas fuel to the liquid fuel is made before the maximum amount of adsorption of the first exhaust gas purification device 15 becomes less than a lower limit value. Here, note that the "lower limit value" referred to herein is a maximum amount of adsorption at which it is considered that the amount of $NO_X$ to be discharged without being adsorbed to the first exhaust gas purification device 15 reaches the regulated amount, and is a value which has been beforehand calculated by adaptation processing making use of experiments, etc.

Figure 3:
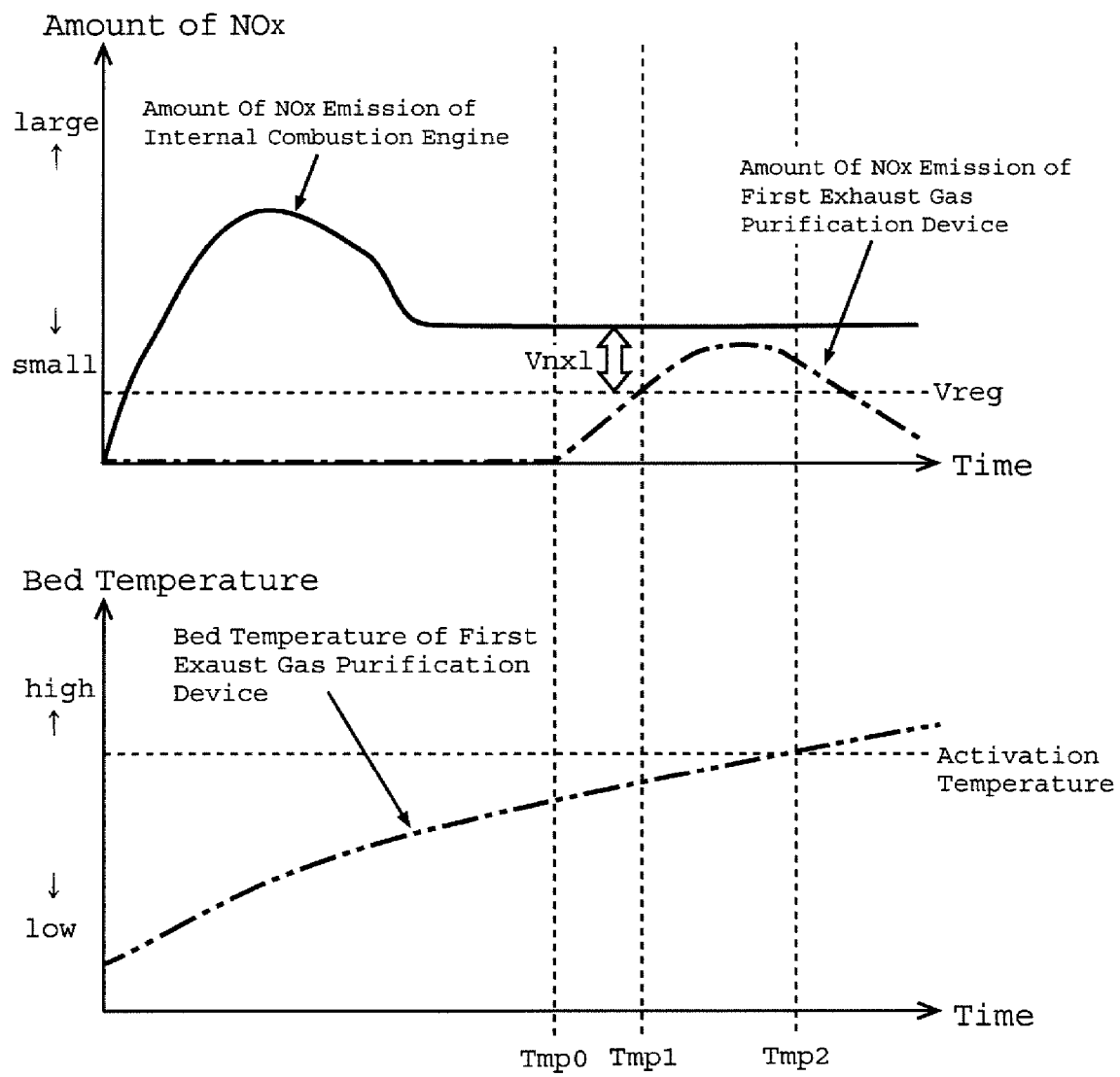
FIG. 3 is a view showing the changes over time of an amount of $NO_X$ discharged from the internal combustion engine, an amount of $NO_X$ discharged from the first exhaust gas purification device, and a bed temperature of the first exhaust gas purification device, in cases where a gas fuel is used at the time of cold start of the internal combustion engine.

As a result of keen and earnest experiments and verification carried out by the inventor of the subject application, it has been found that the maximum amount of adsorption of the first exhaust gas purification device 15 becomes less than the lower limit value before the first exhaust gas purification device 15 becomes active. FIG. 3 is a view measuring the changes over time of an amount of $NO_X$ discharged from the internal combustion engine 1, an amount of $NO_X$ discharged from the first exhaust gas purification device 15, and a bed temperature of the first exhaust gas purification device 15, in cases where the gas fuel is used at the time of cold start of the internal combustion engine 1. A solid line in FIG. 3 represents the amount of $NO_X$ discharged from the internal combustion engine, an alternate long and short dash line represents the amount of $NO_X$ discharged from the first exhaust gas purification device 15, and an alternate long and two short dashes line represents the bed temperature of the first exhaust gas purification device 15.

In FIG. 3, the amount of $NO_X$ discharged from the first exhaust gas purification device 15 becomes substantially zero immediately after the internal combustion engine 1 has been started in a cold state. This is considered that the amount of $NO_X$ discharged from the internal combustion engine 1 is adsorbed by the first exhaust gas purification device 15. Then, when the temperature of the first exhaust gas purification device 15 exceeds the temperature indicated by Tmp0 in FIG. 3, the amount of $NO_X$ discharged from the first exhaust gas purification device 15 begins to increase. This is considered that the maximum amount of adsorption begins to decrease in accordance with the temperature rise of the first exhaust gas purification device 15. Subsequently, when the temperature of the first exhaust gas purification device 15 reaches Tmp1 which is higher than the above-mentioned Tmp0 (adsorption limit temperature), the amount of $NO_X$ discharged from the first exhaust gas purification device 15 increases to a regulated amount Vreg. That is, the maximum amount of adsorption of the first exhaust gas purification device 15 (the difference between the amount of $NO_X$ discharged from the internal combustion engine 1 and the amount of $NO_X$ discharged from the first exhaust gas purification device 15) decreases to a lower limit value Vnxl. Moreover, when the bed temperature of the first exhaust gas purification device 15 comes near to an activation temperature Tmp2 (>Tmp1), the amount of $NO_X$ discharged from the first exhaust gas purification device 15 changes from an increasing tendency to a decreasing tendency. This is inferred that a part of the $NO_X$ is reduced due to a partial activation of the first exhaust gas purification device 15.

As stated in the above-mentioned description of FIG. 3, the maximum amount of adsorption of the first exhaust gas purification device 15 may become less than the lower limit value before the first exhaust gas purification device 15 becomes active. In other words, before the first exhaust gas purification device 15 becomes active, the amount of $NO_X$ discharged from the first exhaust gas purification device 15 may exceed the regulated value. Therefore, if the change from the gas fuel to the liquid fuel is carried out at the time when the temperature of the first exhaust gas purification device 15 reaches the adsorption limit temperature Tmp1, the consumption of the gas fuel can be suppressed to be small, while causing a decrease in the exhaust emission (a decrease in the amount of $NO_X$ to be discharged) by the use of the gas fuel. Here, note that the relation between the adsorption limit temperature Tmp1 and the maximum amount of adsorption may be somewhat changed due to the environment, etc., so the change of fuel may be carried out on the basis of a temperature which is obtained by subtracting a margin from the adsorption limit temperature Tmp1.

Here, note that when the change from the gas fuel to the liquid fuel is carried out, there will be a fear that a situation may occur where the adsorption of $NO_X$ by the first exhaust gas purification device 15 is inhibited by the non-methane hydrocarbons contained in the exhaust gas, but the amount of the non-methane hydrocarbons which can be adsorbed by the first exhaust gas purification device 15 decreases according to the temperature rise of the first exhaust gas purification device 15, so the amount of $NO_X$ to be adsorbed to the first exhaust gas purification device 15 is suppressed from decreasing to a substantial extent.

In addition, because the amount of $NO_X$ discharged from the internal combustion engine 1 increases when the change from the gas fuel to the liquid fuel is carried out, there is a fear that a situation occurs where the amount of $NO_X$ discharged from the first exhaust gas purification device 15 increases accordingly. However, an increased amount of $NO_X$ due to the change of fuel is small to a sufficient extent as compared with a total amount of $NO_X$ which has been adsorbed to the first exhaust gas purification device 15 at the time of use of the gas fuel. In addition, because the temperature of the second exhaust gas purification device 16 has not reached the adsorption limit temperature at the time when the temperature of the first exhaust gas purification device 15 reaches the adsorption limit temperature, the $NO_X$ discharged from the first exhaust gas purification device 15 is adsorbed to the second exhaust gas purification device 16. As a result, it is possible to avoid the situation where the amount of $NO_X$ discharged into atmospheric air due to the change from the gas fuel to the liquid fuel increases. Therefore, the consumption of the gas fuel can be decreased, while obtaining an effect of decreasing the amount of $NO_X$ emission by the use of the gas fuel. Here, note that the amount of carbon dioxide ($CO_2$) contained in the burned gas of the liquid fuel is less than the amount of $CO_2$ contained in the burned gas of the gas fuel. For that reason, it is also possible decrease the amount of emission of $CO_2$ by carrying out the change from the gas fuel to the liquid fuel. Moreover, it is also possible to change the above-mentioned lower limit value and the above-mentioned adsorption limit temperature, while taking into consideration a balance between the amount of emission of $CO_2$ and the amount of emission of $NO_X$.

In addition, in cases where alcohol is contained in the liquid fuel, the lower limit value or the adsorption limit temperature may be changed according to an alcohol concentration in the liquid fuel. When the alcohol concentration of the liquid fuel is high, the non-methane hydrocarbons which are adsorbed to the first exhaust gas purification device 15 in preference to $NO_X$ become more as compared with the case where it is low. This is because non-methane hydrocarbons originated from alcohol are more liable to be adsorbed to the first exhaust gas purification device 15 as compared with non-methane hydrocarbons originated from gasoline. Therefore, when the alcohol concentration in the liquid fuel is high, it is desirable to set the lower limit value to a smaller value (i.e., to set the adsorption limit temperature to a high or large value), as compared with the case where it is low. If the lower limit value and the adsorption limit temperature are defined in this manner, it will become possible to obtain the effect of decreasing the amount of $NO_X$ emission in a more accurate manner. Here, note that the concentration of alcohol contained in the liquid fuel may be detected by an alcohol concentration sensor mounted on a liquid fuel passage which extends from the first fuel tank 111 to the first fuel injection valve 11, or may be estimated from a correction coefficient which is used for air fuel ratio feedback control.

Figure 4:
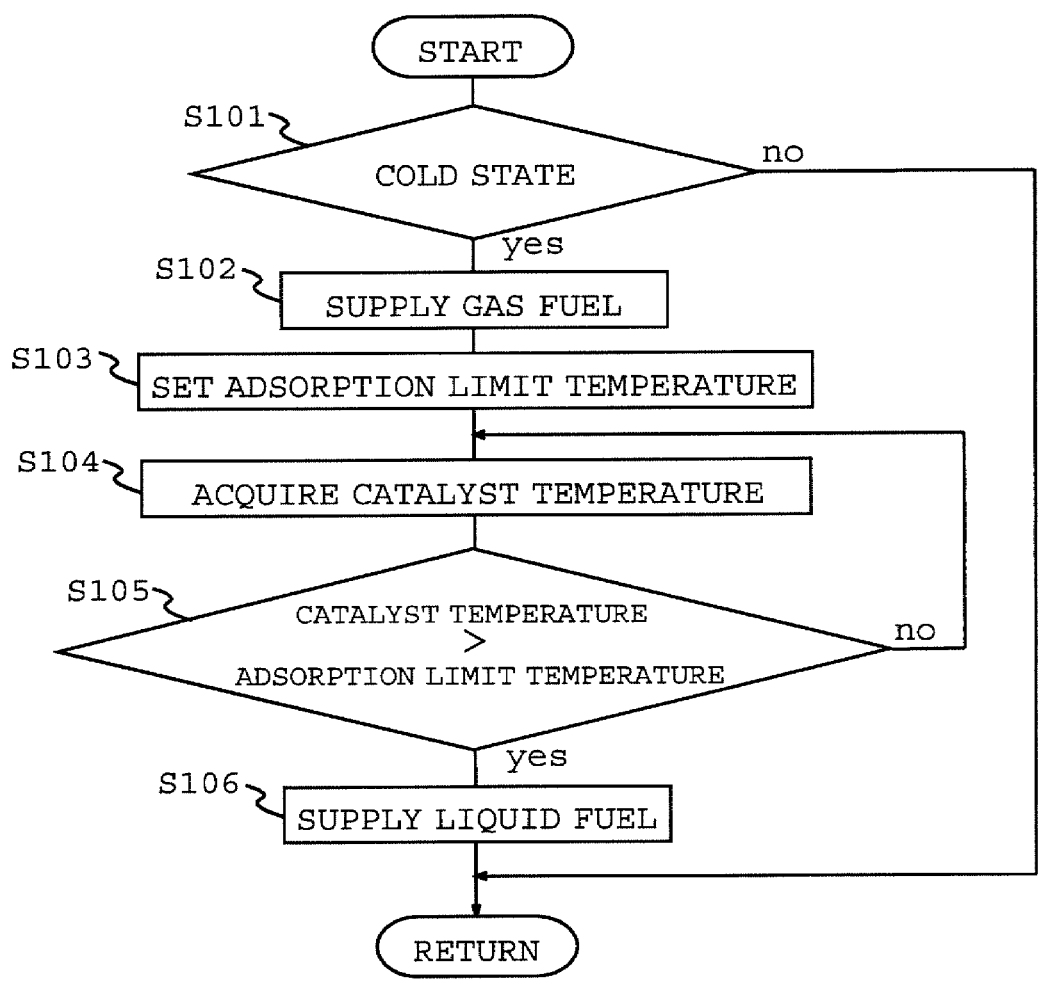
FIG. 4 is a flow chart showing a routine which is executed by an ECU at the time when fuel change control is carried out in the first embodiment.

In the following, reference will be made to a procedure to carry out the fuel change control in this embodiment in line with FIG. 4. FIG. 4 is a flow chart showing a routine which is executed by the ECU 20 at the time when the fuel change control is carried out. This routine is a routine which has been beforehand stored in a ROM of the ECU 20, etc., and is a routine which the ECU 20 executes by making a starting demand (for example, an ON signal of an ignition switch, an ON signal of a switch, etc.) of the internal combustion engine 1 as a trigger.

In the routine of FIG. 4, the ECU 20 first executes the processing of S101. That is, the ECU 20 determines whether the first exhaust gas purification device 15 is in a cold state. For example, the ECU 20 makes a determination that the first exhaust gas purification device 15 is in a cold state, based on the condition that the cooling water temperature of the internal combustion engine 1 is less than a prescribed temperature or the measured value of the exhaust gas temperature sensor 19 is less than the adsorption limit temperature. In cases where a negative determination is made in the above-mentioned step S101, the ECU 20 ends the execution of this routine. On the other hand, in cases where an affirmative determination is made in the above-mentioned step S101, the ECU 20 goes to S102.

In S102, the ECU 20 controls the supply device so that the gas fuel is supplied to the internal combustion engine 1. Specifically, the ECU 20 stops the supply of the liquid fuel by stopping the fuel pump 112, and at the same time, by maintaining the first cutoff valve 113 and the first fuel injection valve 11 in their valve closed states. Moreover, the ECU 20 performs the supply of the gas fuel by maintaining the second cutoff valve 123 in its valve open state, and at the same time, by causing the second fuel injection valve 12 to carry out its opening and closing operation at suitable timing. In this case, the internal combustion engine 1 is operated by burning the gas fuel.

In S103, the ECU 20 acquires the alcohol concentration in the liquid fuel, and decides the adsorption limit temperature by using the alcohol concentration thus acquired as a parameter. In that case, the ECU 20 sets the adsorption limit temperature to be higher when the alcohol concentration in the liquid fuel is high, as compared with the time when it is low.

In S104, the ECU 20 acquires the temperature of the first exhaust gas purification device 15. In that case, the ECU 20 may use the measured value of the exhaust gas temperature sensor 19 as an alternative value of the temperature of the first exhaust gas purification device 15. Here, note that in cases where a temperature sensor capable of directly measuring the bed temperature of the first exhaust gas purification device 15 is mounted on the first exhaust gas purification device 15, the ECU 20 may use the measured value of the above-mentioned temperature sensor as the temperature of the first exhaust gas purification device 15.

In S105, the ECU 20 makes a comparison between the temperatures of the first exhaust gas purification device 15 acquired in the above-mentioned step S104 and the adsorption limit temperature set in the above-mentioned step S103. In that case, when the temperature of the first exhaust gas purification device 15 is equal to or less than the adsorption limit temperature, the ECU 20 returns to S104. On the other hand, when the temperature of the first exhaust gas purification device 15 is higher than the adsorption limit temperature, the ECU 20 goes to S106.

In S106, the ECU 20 controls the supply device so that the fuel being used in the internal combustion engine 1 is changed from the gas fuel to the liquid fuel. Specifically, the ECU 20 stops the supply of the gas fuel by maintaining the second fuel injection valve and the second cutoff valve 123 in their valve closed states. Further, the ECU 20 causes the liquid fuel in the first fuel tank 111 to be supplied to the first fuel injection valve 11 by operating the fuel pump 112, and at the same time, by opening the first cutoff valve 113. Subsequently, the ECU 20 causes the liquid fuel to be supplied to each cylinder of the internal combustion engine 1 by performing the opening and closing operation of the first fuel injection valve in accordance with the injection timing of each cylinder 2.

As described above, by carrying out the routine of FIG. 4 by means of the ECU 20, a control unit according to the present invention is achieved. As a result of that, it is possible to avoid the situation where the gas fuel is consumed under a condition in which the effect of reducing the amount of $NO_X$ emission by the use of the gas fuel can not be obtained to a sufficient extent. Therefore, the consumption of the gas fuel can be suppressed to be small, while obtaining the effect of decreasing the amount of $NO_X$ emission by the use of the gas fuel.

Here, note that the time of carrying out the fuel change control is not limited to the time of cold start of the internal combustion engine 1, but may be any time in which the first exhaust gas purification device 15 is in a cold state. In that case, the ECU should only perform the above-mentioned routine of FIG. 4 in a periodical manner. Incidentally, it can be considered that after the change from the gas fuel to the liquid fuel has been performed, the temperature of the first exhaust gas purification device 15 again drops to less than the adsorption limit temperature. In such a case, if a change is again made from the liquid fuel to the gas fuel, the fuel change control may be subjected to hunting. Therefore, a change from the liquid fuel to the gas fuel may be prohibited for a certain fixed period of time after the change from the gas fuel to the liquid fuel has been carried out.

Second Embodiment

Next, reference will be made to a second embodiment of the present invention based on FIGS. 5 through 6. Here, a construction different from that of the above-mentioned first embodiment will be described, and an explanation of the same construction will be omitted.

Figure 5:
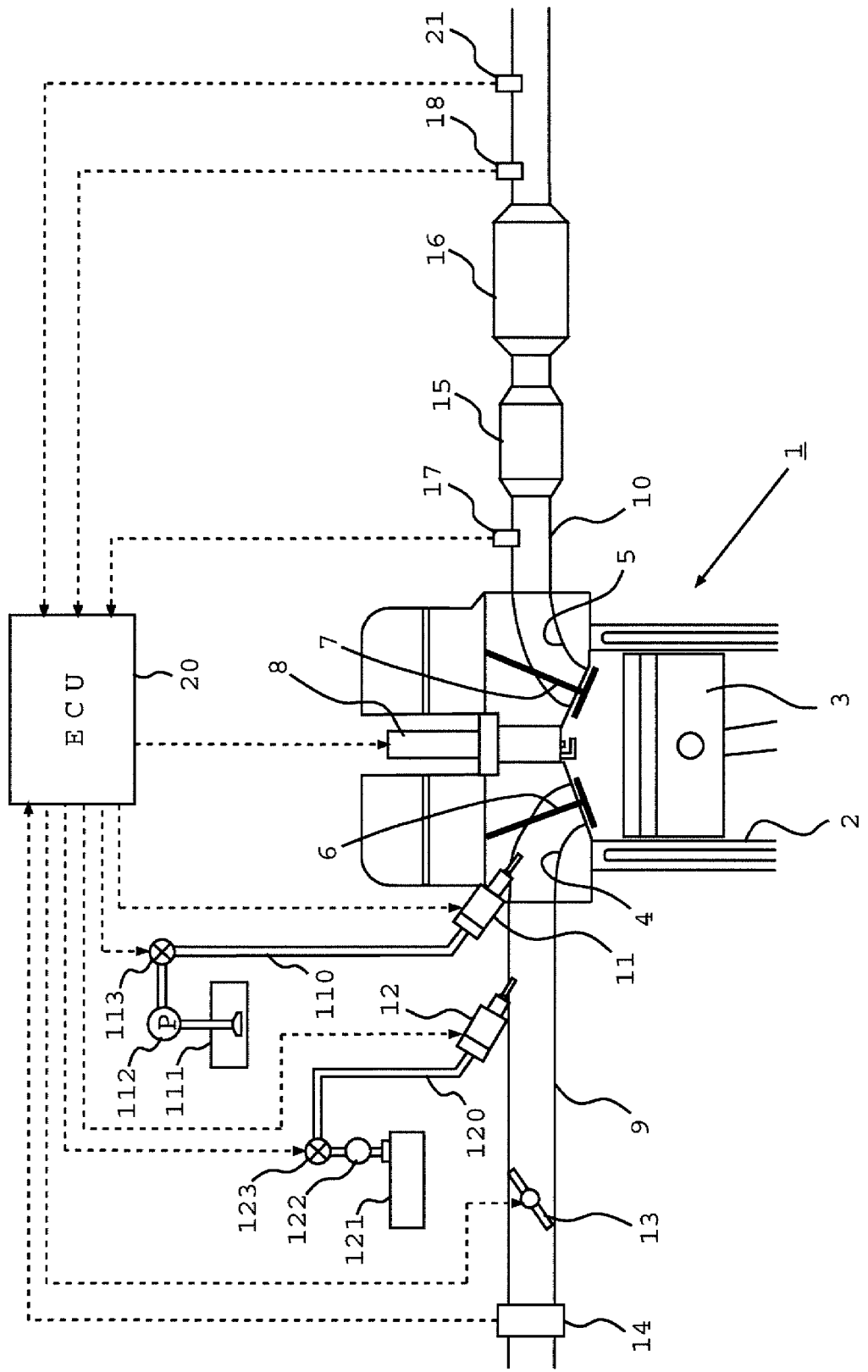
FIG. 5 is a view showing the schematic construction of an internal combustion engine to which the present invention is applied, in a second embodiment.

FIG. 5 is a view showing the schematic construction of an internal combustion engine according to this embodiment. In FIG. 5, the same symbols are attached to the same components as those in FIG. 1 of the above-mentioned first embodiment.

In FIG. 5, a $NO_X$ sensor 21 is mounted on the exhaust passage 10 of the internal combustion engine 1 in place of the exhaust gas temperature sensor 19. In that case, the ECU 20 performs the fuel change control based on a measured value of the $NO_X$ sensor 21 (an amount of $NO_X$ discharged from the first exhaust gas purification device 15) in place of the temperature of the first exhaust gas purification device 15.

In the following, reference will be made to a procedure to carry out the fuel change control in this embodiment in line with FIG. 6. FIG. 6 is a flow chart showing a routine which is executed by the ECU 20 at the time when the fuel change control is carried out. This routine is a routine which is executed by the ECU 20 at the time when a starting demand for the internal combustion engine 1 is generated, or in a periodical manner, similar to the routine of FIG. 4 in the above-mentioned first embodiment. Here, note that in FIG. 6, the same symbols are attached to the same processes as those in the routine of FIG. 4.

Figure 6:
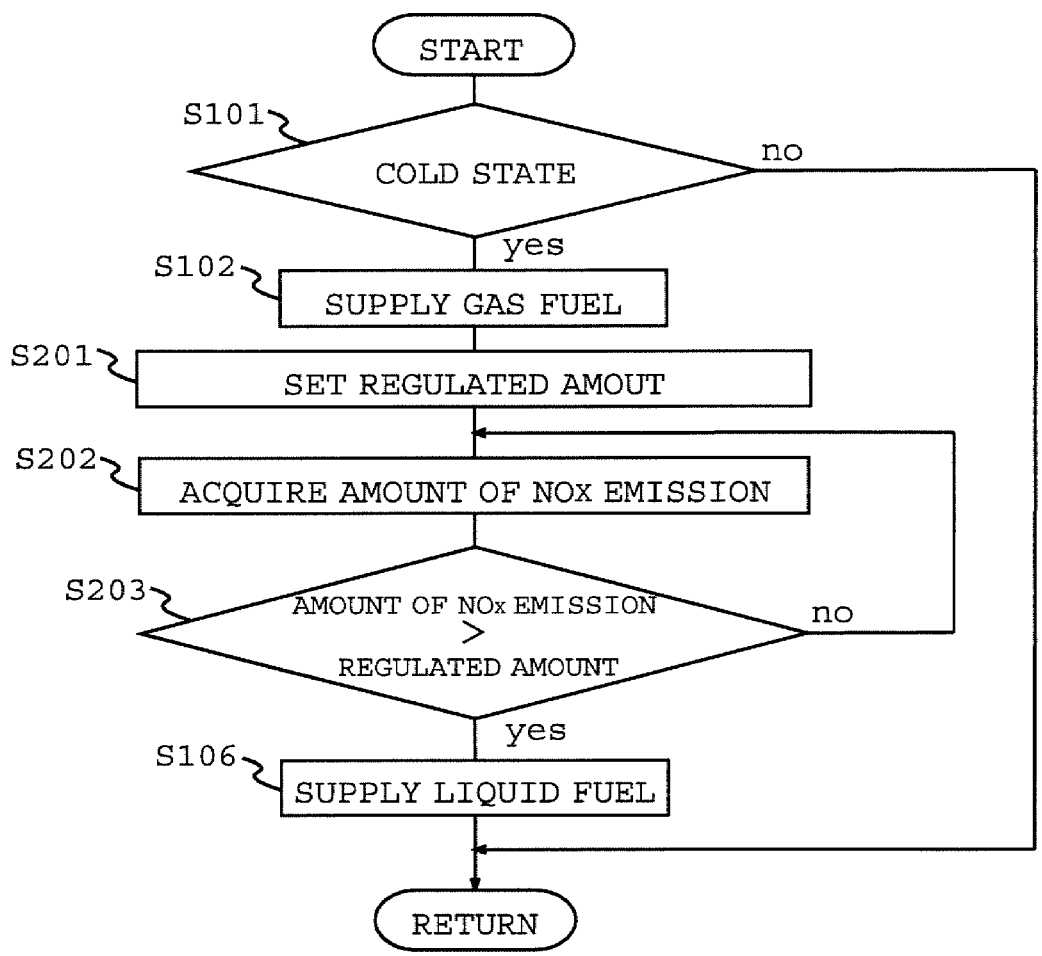
FIG. 6 is a flow chart showing a routine which is executed by an ECU at the time when fuel change control is carried out in the second embodiment.

The difference between the routine of FIG. 4 and the routine of FIG. 6 is in the point that the processes of S201 through S203 are executed in place of the processes of S103 through S105. That is, the ECU 20 sets, in S201, a regulated amount which is an upper limit value of the amount of $NO_X$ discharged from the first exhaust gas purification device 15. In that case, the ECU 20 sets the regulated amount to be larger when the alcohol concentration in the liquid fuel is high, as compared with the time when it is low.

In S202, the ECU 20 reads in the measured value of the $NO_X$ sensor 21 (the amount of $NO_X$ emission). Subsequently, the ECU 20 goes to S203 in which it makes a comparison between the amount of $NO_X$ emission acquired in the above-mentioned step S202 and the regulated amount set in the above-mentioned step S201. In that case, when the amount of $NO_X$ emission is equal to or less than the regulated amount, the ECU 20 returns to S202. On the other hand, when the amount of $NO_X$ emission exceeds the regulated amount, the ECU 20 goes to S106 in which it controls the supply device so that the fuel being used in the internal combustion engine 1 is changed from the gas fuel to the liquid fuel.

By executing the routine of FIG. 6 by means of the ECU 20 in this manner, the same operation and effect as in the above-mentioned first embodiment can be obtained.

Third Embodiment

Next, reference will be made to a third embodiment of the present invention based on FIG. 7. Here, a construction different from that of the above-mentioned first embodiment will be described, and an explanation of the same construction will be omitted.

The difference between the above-mentioned first embodiment and this embodiment is in the point that the change of the fuel being used is made based on the temperature of the first exhaust gas purification device 15 (hereinafter referred to as a "non-adsorption temperature") at the time when the first exhaust gas purification device 15 becomes unable to adsorb non-methane hydrocarbons.

Figure 7:
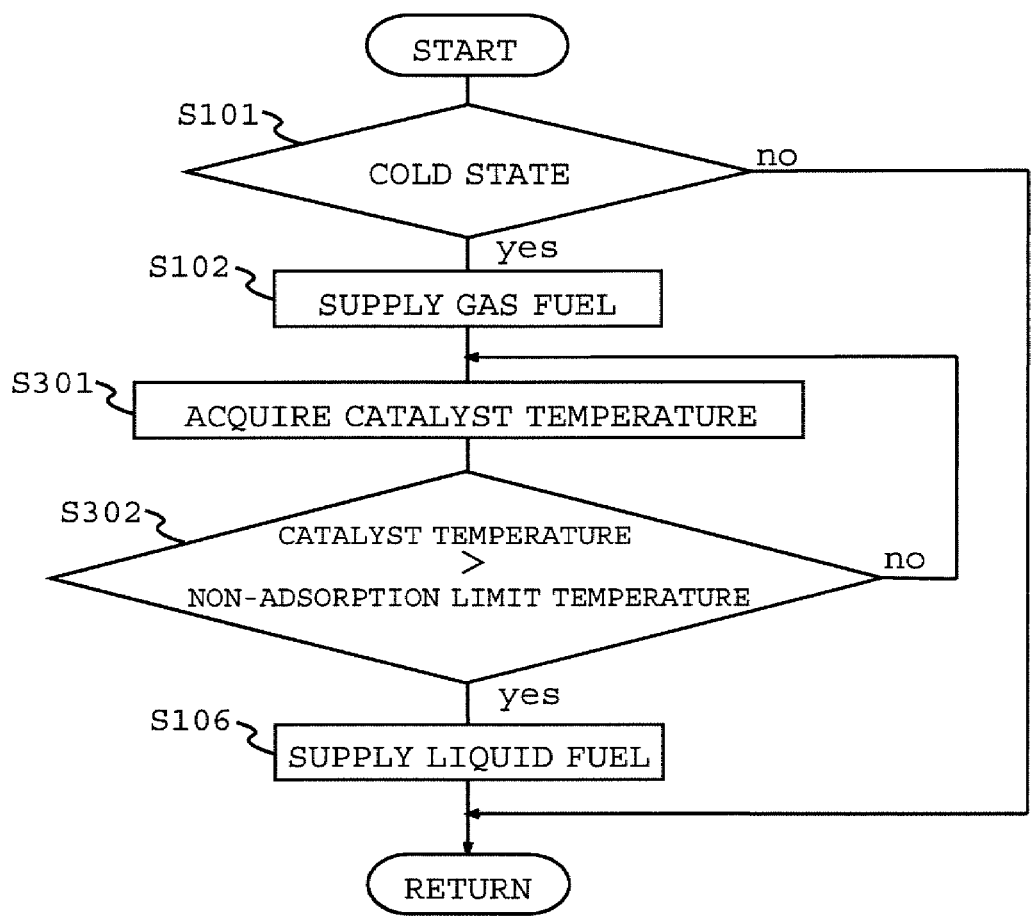
FIG. 7 is a flow chart showing a routine which is executed by an ECU at the time when fuel change control is carried out in a third embodiment.

FIG. 7 is a flow chart showing a routine which is executed by the ECU 20 at the time when the fuel change control is carried out. This routine is a routine which is executed by the ECU 20 at the time when a starting demand for the internal combustion engine 1 is generated, or in a periodical manner, similar to the routine of FIG. 4 in the above-mentioned first embodiment. Here, note that in FIG. 7, the same symbols are attached to the same processes as those in the routine of FIG. 4.

The difference between the routine of FIG. 4 and the routine of FIG. 7 is in the point that the processes of S301 through S302 are executed in place of the processes of S103 through S105. That is, after executing the processing of S102, the ECU 20 goes to S301 in which it acquires the temperature of the first exhaust gas purification device 15 (the measured value of the exhaust gas temperature sensor 19).

Subsequently, the ECU 20 goes to S302 in which it makes a comparison between the temperatures of the first exhaust gas purification device 15 acquired in the above-mentioned step S301 and the non-absorption temperature. Here, note that it is assumed that the non-adsorption temperature has been beforehand obtained experimentally. When the temperature of the first exhaust gas purification device 15 is equal to or less than the non-adsorption temperature, the ECU 20 returns to S301. On the other hand, when the temperature of the first exhaust gas purification device 15 is higher than the non-adsorption temperature, the ECU 20 goes to S106 in which it controls the supply device so that the fuel being used in the internal combustion engine 1 is changed from the gas fuel to the liquid fuel.

By executing the routine of FIG. 7 by means of the ECU 20 in this manner, the same operation and effect as in the above-mentioned first embodiment can be obtained.

Fourth Embodiment

Next, reference will be made to a fourth embodiment of the present invention based on FIGS. 8 through 9. Here, a construction different from that of the above-mentioned first embodiment will be described, and an explanation of the same construction will be omitted.

Figure 8:
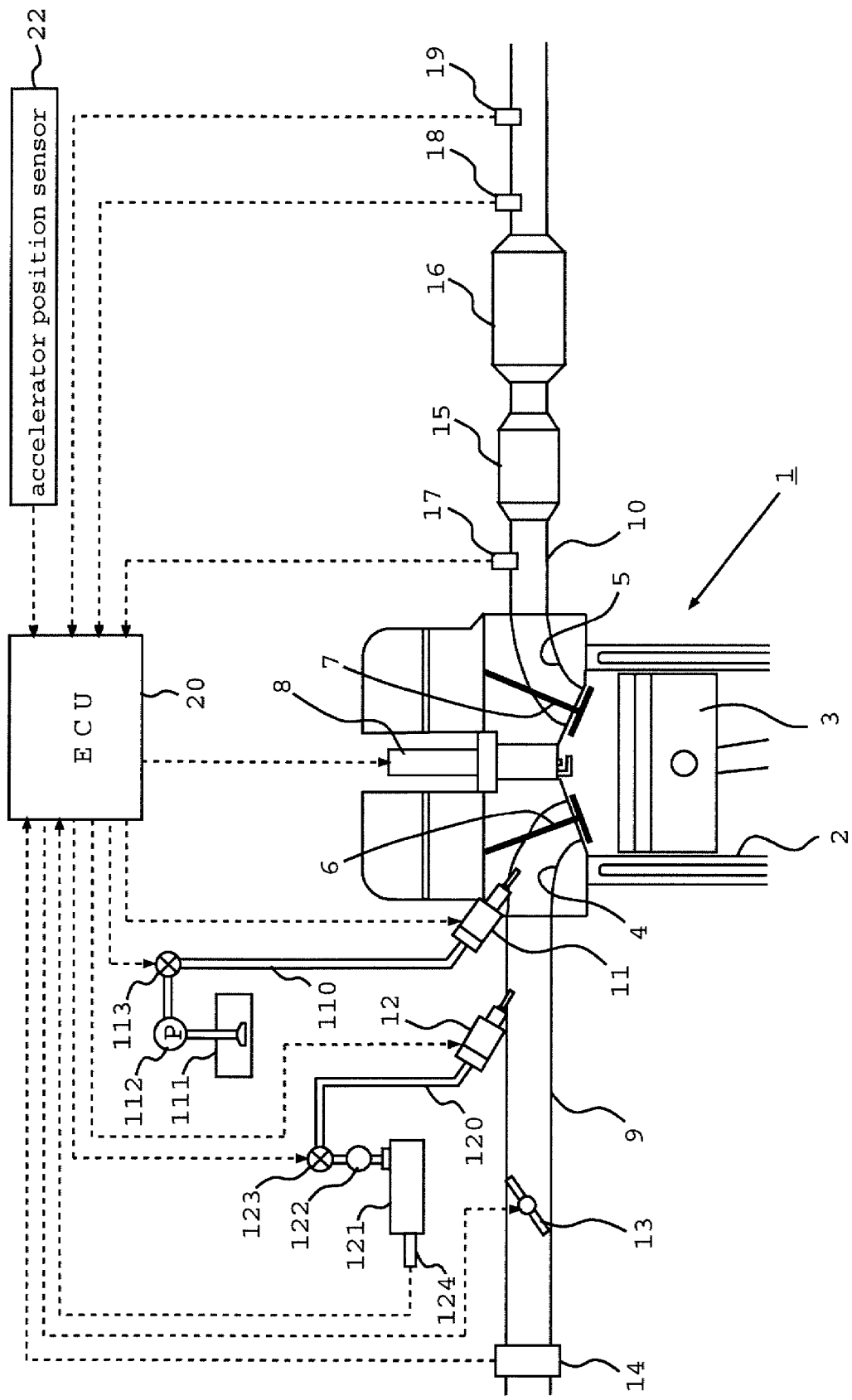
FIG. 8 is a view showing the schematic construction of an internal combustion engine to which the present invention is applied, in a fourth embodiment.

FIG. 8 is a view showing the schematic construction of an internal combustion engine according to this embodiment. In FIG. 8, the same symbols are attached to the same components as those in FIG. 1 of the above-mentioned first embodiment.

In FIG. 8, on a second fuel tank 121, there is mounted a residual amount sensor 124 which serves to output an electrical signal correlated with the amount of the gas fuel stored in a second fuel tank 121. In addition, an accelerator position sensor 22 for measuring an amount of operation (accelerator opening) of an unillustrated accelerator pedal is electrically connected to the ECU 20.

Here, the difference between the fuel change control in this embodiment and the fuel change control in the above-mentioned first embodiment is in the point that when the residual or remaining amount of the gas fuel (the amount of the gas fuel stored in the second fuel tank 121) is equal to or more than a predetermined amount, and when the operating state of the internal combustion engine 1 is in an idle operation state, the use of the gas fuel is continued even after a condition for changing from the gas fuel to the liquid fuel has been satisfied.

When the internal combustion engine 1 is in the idle operation state, the consumption of the gas fuel decreases. Therefore, even if the use of a small amount of the gas fuel is continued during the time when there is a large remaining amount of the gas fuel, it is possible to avoid a situation where a travel range by the gas fuel is shortened to a substantial extent. In addition, when the internal combustion engine 1 is in an idle operation state, there is a high possibility that the operation of the internal combustion engine 1 will be stopped, and hence, when the amount of non-methane hydrocarbon adsorbed to the first exhaust gas purification device 15 is decreased by the use of the gas fuel, it is possible to avoid a situation where the amount of $NO_X$ which can be adsorbed by the first exhaust gas purification device 15 at the time of next engine starting decreases in an excessive extent.

Figure 9:
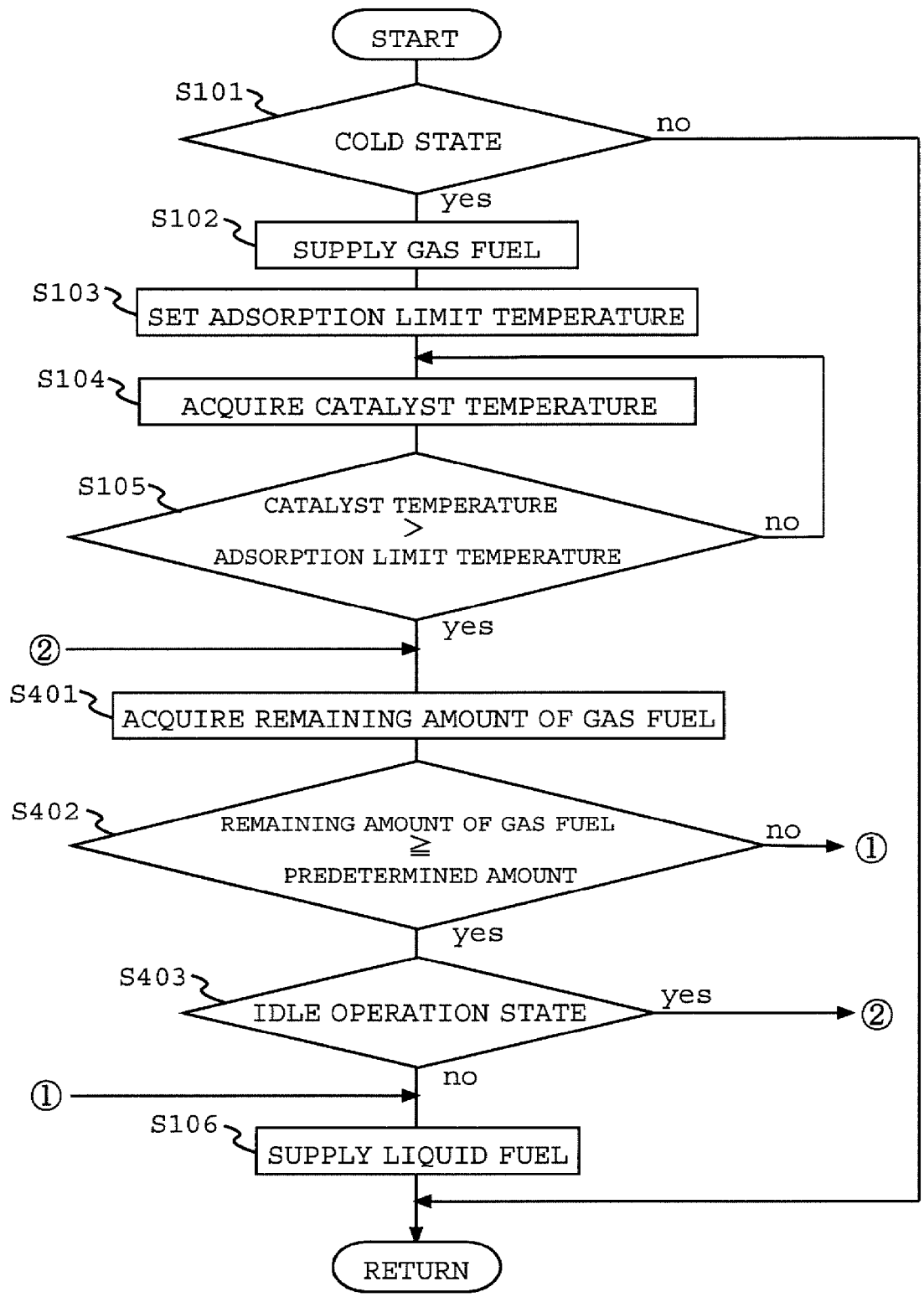
FIG. 9 is a flow chart showing a routine which is executed by an ECU at the time when fuel change control is carried out in the fourth embodiment.

FIG. 9 is a flow chart showing a routine which is executed by the ECU 20 at the time when the fuel change control is carried out. This routine is a routine which is executed by the ECU 20 at the time when a starting demand for the internal combustion engine 1 is generated, or in a periodical manner, similar to the routine of FIG. 4 in the above-mentioned first embodiment. Here, note that in FIG. 9, the same symbols are attached to the same processes as those in the routine of FIG. 4.

The difference between the routine of FIG. 4 and the routine of FIG. 9 is in the point that when an affirmative determination is made in S105, the processes of S401 through S403 are executed. That is, in cases where an affirmative determination is made in S105, the ECU 20 goes to S401 in which it reads in the measured value of the residual amount sensor 124 (the residual or remaining amount of the gas fuel).

Subsequently, the ECU 20 goes to S402 in which it determines whether the remaining amount of the gas fuel acquired in the above-mentioned step S401 is equal to or more than the predetermined amount. The "predetermined amount" referred to herein is an amount at which it is considered that the gas fuel in the second fuel tank 121 remains to a sufficient extent even if the gas fuel continues to be used during the idle operation of the internal combustion engine 1, and it is an amount which has been beforehand defined by the adaptation processing using experiments, etc. When a negative determination is made in the above-mentioned step S402, the ECU 20 goes to S106 in which it controls the supply device so that the fuel being used in the internal combustion engine 1 is changed from the gas fuel to the liquid fuel. On the other hand, in cases where an affirmative determination is made in the above-mentioned step S402, the ECU 20 goes to S403.

In S403, the ECU 20 determines whether the internal combustion engine 1 is in an idle operation state. For example, the ECU 20 determines whether the measured value (accelerator opening) of the accelerator position sensor 22 is zero. When a negative determination is made in the above-mentioned step S403, the ECU 20 goes to S106 in which it controls the supply device so that the fuel being used in the internal combustion engine 1 is changed from the gas fuel to the liquid fuel. On the other hand, in cases where an affirmative determination is made in the above-mentioned step S403, the ECU 20 returns to S401. In that case, the internal combustion engine 1 continues to be operated by the use of the gas fuel. As a result, in cases where the internal combustion engine 1 is stopped from the idle operation state, the amount of the non-methane hydrocarbon which has been adsorbed to the first exhaust gas purification device 15 can be suppressed to be small. Consequently, it is possible to avoid a situation where the amount of $NO_X$ which can be adsorbed by the first exhaust gas purification device 15 at the time of next engine starting becomes small.

Here, note that the fuel change control in this embodiment may be combined with the fuel change control described in the above-mentioned second embodiment or the third embodiment.

DESCRIPTION OF THE REFERENCE NUMERALS AND SYMBOLS 1 internal combustion engine
2 cylinder(s)
4 intake port
5 exhaust port
6 intake valve
7 exhaust valve
8 ignition plug
9 intake passage
10 exhaust passage
11 first fuel injection valve
12 second fuel injection valve
15 first exhaust gas purification device
16 second exhaust gas purification device
17 air fuel ratio sensor
18 $O_2$ sensor
19 exhaust gas temperature sensor
21 $NO_X$ sensor
110 first fuel passage
111 first fuel tank
112 fuel pump
113 first cutoff valve
120 second fuel passage
121 second fuel tank
122 regulator
123 second cutoff valve
124 residual amount sensor

The invention claimed is:

1. A fuel injection system of an internal combustion engine in which an exhaust gas purification catalyst, which absorbs nitrogen oxides in an exhaust gas when it is in a cold state lower in temperature than an activation temperature thereof, is arranged on an exhaust system, said fuel injection system comprising:
a supply device that supplies to said internal combustion engine either a first fuel which inhibits a phenomenon in which nitrogen oxides are adsorbed to said exhaust gas purification catalyst or a second fuel which does not inhibit the phenomenon in which nitrogen oxides are adsorbed to said exhaust gas purification catalyst; and
a control unit that controls said supply device in such a manner that only said second fuel is first supplied to said internal combustion engine when said exhaust gas purification catalyst is in a cold state, and a change from a state in which only said second fuel is supplied to said internal combustion engine to a state in which only said first fuel is supplied to said internal combustion engine in then made before said exhaust gas purification catalyst subsequently rises in temperature to said activation temperature,
wherein when said second fuel is supplied to the internal combustion engine, said control unit controls said supply device in such a manner that a change from said second fuel to said fuel is made when a maximum amount of adsorption which is a maximum value of an amount of nitrogen oxides which can be adsorbed to said exhaust as purification catalyst decreases to less than a lower limit value thereof.

2. The fuel injection system of an internal combustion engine in claim 1, wherein said control unit makes a determination that a maximum amount of adsorption of said exhaust gas purification catalyst has become less than a lower limit value, on the condition that the temperature of said exhaust as purification catalyst exceeds an adsorption limit temperature which is lower than said activation temperature.

3. The fuel injection system of an internal combustion engine in claim 1, wherein
said first fuel is a liquid fuel containing alcohol, and
said lower limit value is set to be smaller when an alcohol concentration of the first fuel is high than when it is low.

4. The fuel injection system of an internal combustion engine in claim 1, wherein said control unit controls said supply device so that a change from said first fuel to said second fuel is not made when the maximum amount of adsorption of said exhaust gas purification catalyst increases equal to or more than a lower limit value thereof after a change from said second fuel to said first fuel has been made.

5. The fuel injection system of an internal combustion engine in claim 3, wherein said control unit controls said supply device so that a change from said first fuel to said second fuel is not made when the maximum amount of adsorption of said exhaust gas purification catalyst increases equal to or more than a lower limit value thereof after a change from said second fuel to said first fuel has been made.

6. The fuel injection system of an internal combustion engine in claim 1, wherein
said first fuel is a non-methane based hydrocarbon fuel, and
said second fuel is a natural as fuel.

7. The fuel injection system of an internal combustion engine in claim 3, wherein
said first fuel is a non-methane based hydrocarbon fuel, and
said second fuel is a natural gas fuel.

* * * * *